United States Patent Office 3,584,098
Patented June 8, 1971

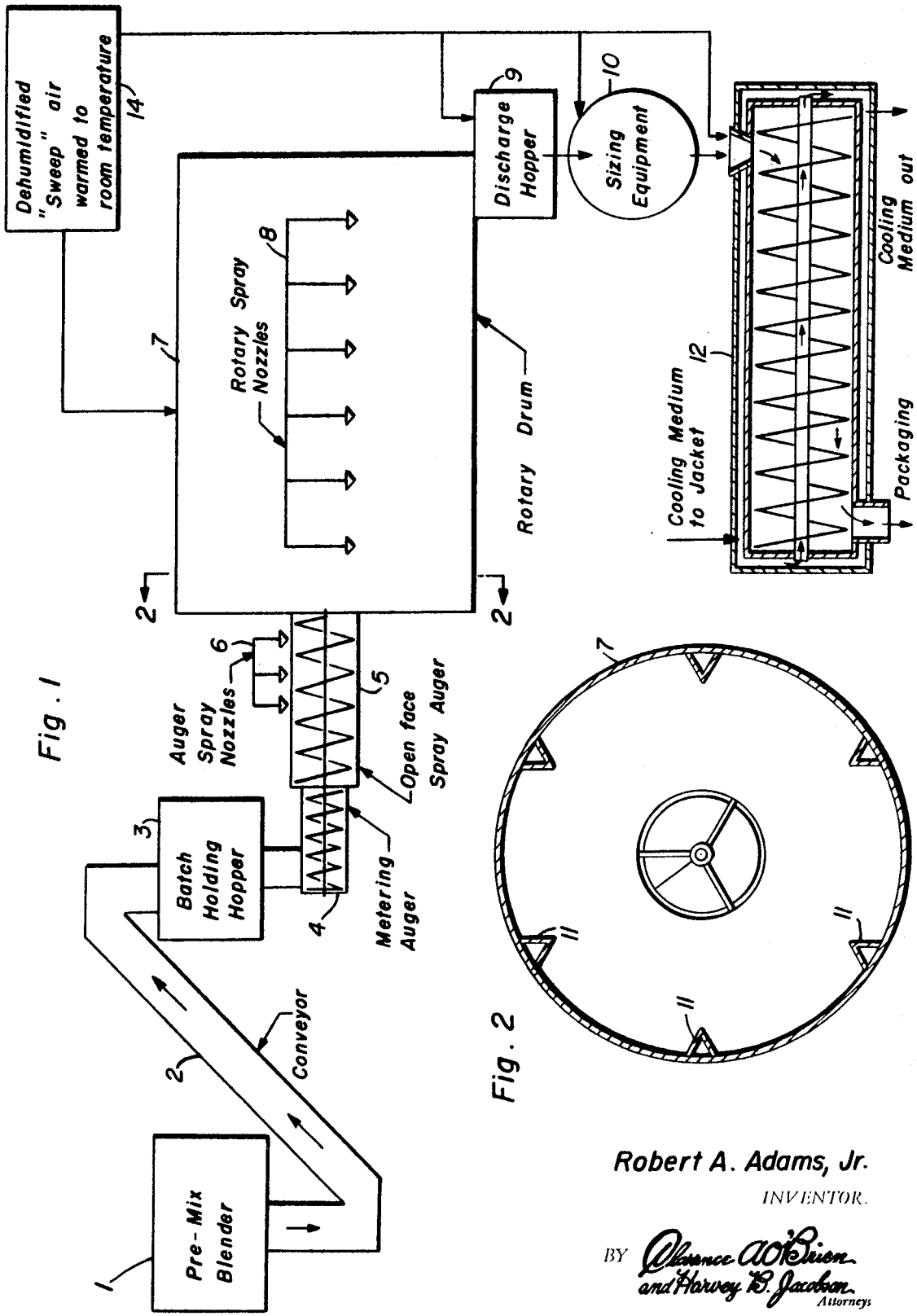

3,584,098
METHOD OF MANUFACTURE OF IMPROVED
SEWER AND DRAIN CLEANER COMPOSITIONS
Robert A. Adams, Jr., Stone Mountain, Ga., assignor to
Consolidated Foods Corporation
Continuation-in-part of application Ser. No. 530,641,
Feb. 28, 1966. This application Aug. 6, 1969, Ser.
No. 850,319
Int. Cl. B01j 2/12
U.S. Cl. 264—117          11 Claims

ABSTRACT OF THE DISCLOSURE

A method of producing homogeneous pellets of a drain cleaner composition comprising alkali metal hydroxide, particulate aluminum or aluminum and zinc, sodium nitrate and sodium chloride wherein the intimately admixed components are introduced into a rotary drum pellet mill wherein homogeneous pellets are formed. The so formed pellets are then preferably cooled to a temperature sufficiently low to preclude any significant reaction of the components which undesirable reaction would result in the expending of a significant proportion of the heat producing capability of the final product.

---

This is a continuation-in-part of my prior copending application Ser. No. 530,641, filed Feb. 28, 1966, now abandoned in favor of this application.

This invention relates generally to a method of manufacturing a heat-producing composition and more particularly to a method of manufacturing a particulate composition adapted to develop heat when added to water to assist in clearing an impediment from a sewer or drain line. More specifically the present invention relates to a method of manufacturing a sewer or drain cleaner composition which is characterized by a highly improved physical form, and comprises an admixture of an alkali metal hydroxide, particulate aluminum, or aluminum and zinc, and oxidizer such as a water-soluble inorganic nitrate, and sodium chloride together with optional catalytic agents, and inert carriers or fillers such as copper sulphate, sodium carbonate, sodium silicate, etc.

It is known to be old to prepare sewer and drain cleaning compositions of the general formulation described. Many of such compositions proposed heretofore have been characterized by a tendency for the active compounds to separate out during manufacture, transportation, and storage thereof, inasmuch as the compositions are generally an admixture, or heterogeneous blend, of discrete particles of the components. Therefore, when such a heterogeneous drain cleaner composition is introduced into the residual water in a sewer, drain line, trap or the like to clear the same of an impediment, the individual particulate components tend to react in a manner other than that which is most desirable due to the fact that a random portion of the composition taken from a consumer package, for example, no longer contains proper proportions of the respective components.

Furthermore, due to the segregation of the several particulate components comprising the composition the reaction may or may not generate the desired maxium heat and gas due to the fact, for example, that the caustic present in the composition upon being wetted by the water present within a sewer or drain line reacts prematurely before reaching the site of the impediment to be cleared from the line. In addition, this also gives rise to a further problem in that the reaction can be of such violence that the highly caustic solution, of sufficient concentration to cause serious chemical burns, is spattered onto the body of the person utilizing the cleaner.

As stated heretofore the over-all composition of drain cleaners of the nature described is generally uniform. However, since the components of such compositions are of different specific gravities and particle sizes they tend to separate as the product is transported or otherwis handled. A number of methods have therefore been proposed heretofore in attempting to manufacture heat-producing drain cleaner compositions which do not tend to segregate during manufacture, storage, transportation and utilization thereof so as to insure safe, efficient and economical action of the drain cleaner composition.

Accordingly, it may be seen that the uniformity of distribution of the several components of the composition is an important factor in determining the over-all efficiency of the drain cleaner composition and presents a rather difficult manufacturing problem where it is essential that random samples of the composition accurately represent the formulation of the composition. With many sewer and drain cleaner compositions produced by methods known heretofore, samples withdrawn from large batches do not, as a general rule, express the average formulation of the composition. In addition, even if such samples did as a rule reflect the proper formulation upon completion of the manufacturing process, upon resampling of portions of the composition from consumer packages and the like, subsequent to storage and transportation thereof, it would undoubtedly be noted that the samples no longer contain representative proportions of the components comprising the composition, due to the tendency of certain of the components to segregate relative to the remaining components.

It is therefore an object of the present invention to provide a method of manufacturing a drain cleaner composition characterized by a highly improved physical form whereby undesired segregation of the several particulate components utilized in the composition is avoided during shipment, storage and utilization thereof.

It is another object of the present invention to provide a method of manufacturing a sewer or drain cleaner composition in highly improved physical form wherein all the components of the composition are homogeneously distributed throughout the individual particles of the finished composition so as to avoid segregation, caking and/or dusting thereof.

Still another object of the present invention is to provide a highly simplified method of manufacturing a sewer or drain cleaner composition characterized by a highly improved spherical form and homogeneous nature wherein the components comprising the composition are intimately admixed after which they are tackified with an appropriate amount of water at about 130°–155° F. which must be distributed uniformly over the batch with considerable attention to volume relationships. The tackified admixture is then introduced into a rotary pelletizing drum where after a time delay of about three minutes additional amounts of water at about 130°–155° F., as required, are sprayed onto the tacky composition to maintain the temperature of the mix at about 135° to about 150° F. and preferably 140°–145° F. to facilitate the formation of substantially homogeneous spherical pellets of predetermined sizes.

Still a further object of the present invention is to provide a method of manufacturing a drain cleaner composition in highly improved physical form, namely in generally spherical pelletized form, wherein each pellet has a substantially homogeneous formulation so as to include representative proportions of each and every component comprising the composition.

Still a further object of the present invention is to provide a method of manufacturing an improved drain cleaner composition characterized by a highly improved spherical form which method is characterized by a series of relatively simple manipulative steps wherein rather critical conditions must be maintained in order to satisfactorily pelletize the drain cleaner composition.

Still a further object of the present invention is to provide a method of manufacturing an improved drain cleaner composition characterized by a cylindrical pelletized form by subjecting the composition under controlled parameters to the action of a water spray whereby the mix going into a pelletizing machine is plasticized and partially agglomerated while being die extruded from the drum of the pellet mill (not shown). The cylindrical pellets may then be sprayed with water in a rotary pelletizing drum such that they are converted into generally spherical pellets of predetermined sizes.

Still a further object of the present invention is to provide an improved method of manufacturing a drain cleaner composition characterized by highly improved physical form which obviates many of the hazardous, complicated, manipulative steps practiced in methods known heretofore for the production of somewhat homogeneous drain cleaner compositions.

Further objects and aspects of the invention will become apparent from the following discussion taken together with the drawing wherein:

FIG. 1 is a diagrammatic representation, or flow diagram of an exemplary apparatus utilized in carrying forth an exemplary mode of the method comprising the present invention.

FIG. 2 is an enlarged cross-sectional view of an exemplary type of pelletizing drum, or mill, taken substantially along the plane of the line 2—2 of FIG. 1.

Briefly, in the practice of my invention the active components namely an alkali metal hydroxide, water-soluble inorganic nitrate, particulate aluminum, or aluminum and zinc, sodium chloride and inert or exothermic salts and the like are pre-blended and charged into a rotary drum pelletizer such as by a positive feed open face auger. In one mode of carrying forth the process, while passing through the open face auger the intimately admixed particulate composition is sprayed with a sufficient amount of water at a temperature of about 130° to about 155° F. to tackify the composition so that the several active components including the aluminum do not segregate, being certain of course not to add sufficient water to form a "gummy" or highly plastic composition that would tend to form excessively large pellets in the rotary drum.

While it is not intended to be restricted by this analysis, it is believed that the adhesion of the active components into a tackified mass and subsequent formation of discrete generally spherical particles is a consequence of a controlled reaction among the active components such that a small amount of water has a considerable effect. It will therefore be appreciated that for the above reasons the amount of water which may be required to properly pelletize the composition in this mode of the method is reasonably critical and furthermore the amount of water required per unit of mix generally varies inversely with the over-all batch weight. Once the tackified mix is introduced into the rotary pelletizing drum the heat of reaction tends to partially dry the composition thus generally necessitating that the mass be sprayed with additional water to bring it into the condition essential to permit proper pelletizing thereof. Generally, approximately two-thirds of the water required is sprayed onto the pre-blended composition in the above-mentioned auger and approximately one-third of the necessary water is applied to the tackified composition subsequent to its introduction into the rotary pelletizing drum with a delay of about three minutes between the two applications of water.

As stated above, the over-all proportion of water required to tackify and pelletize the particulate composition does vary somewhat depending on batch size, size of individual particles of the components comprising the composition, etc., moreover, it will be noted that the temperature of the water utilized to tackify and plasticize the composition sufficiently to permit proper pelletizing thereof is relatively critical. This is true with regard to the water being sprayed onto the pre-blended composition to tackify it as it passes through the auger as well as the water being applied in the rotary drum. The temperature of the water must be in the range of about 100° to 160° F., with an optimum temperature range of about 130° to 155° F.

From the foregoing, it may therefore be appreciated that the parameters of the conditions attendant to the manipulative steps comprising the novel method of the present invention are highly critical inasmuch as an excess of water causes an excessive reaction between the active components of the composition thus causing the mass to become too wet, hot, and thus difficult if not impossible to properly pelletize. On the other hand, the addition of an insufficient amount of water does not tackify the component of the composition sufficiently to permit proper pelletizing.

Toward this end, there are several other considerations which are reasonably critical to the practice of the present invention. For example, the particle size of the particulate aluminum utilized determines not only the ultimate reaction of the several active components of the composition when wetted with water but also cooperates in a manner not fully understood to affect the rate at which the pelletized composition dries sufficiently to permit discharging the completed product from the rotary pelletizing drum, which of course is of considerable interest when attempting to keep the process-through time to a minimum. It has been found that a commercial grade of finely divided particulate aluminum shot preferably having an aluminum purity greater than 97% which pass through a 6 mesh Tyler Standard screen and are retained on a 20 mesh Tyler Standard screen may be utilized. Another form of particulate aluminum needles which may be utilized is referred to as "200X"; however, grade "300X" may also be utilized. The 200X grade has about 1% retained on a 10 mesh Tyler Standard Screen and about 99.5% retained on a 60 mesh Tyler Standard screen whereas the 300X has about 1% retained on a 6 mesh Tyler Standard screen and 99% retained on a 40 mesh Tyler Standard screen. It will be understood that a mixture of the above-mentioned shot and needles may also be utilized. In addition, it is possible to use some particulate zinc with the aluminum in the formulation, to effect a cost reduction when pelletizing the composition in a rotary pellet mill-extruder (not shown).

Although not considered critical, the caustic preferably utilized is the so-called crystal or ground caustic which is commercially available, however flakes or granules may also be utilized. In addition, with regard to the sizing and form of the sodium nitrate utilized, the best results are generally obtained by utilizing powdered sodium nitrate such as may be obtained by crushing prills such as those which are commercially available in a size range from approximately $\frac{1}{16}''$ to $\frac{1}{8}''$ diameter, for example.

The size of the individual generally spherical or cylindrical pellets comprising the improved drain cleaner composition produced by the method of the present invention is in one mode of the invention to a large degree determined by the size of the individual particles of the starting materials as well as the moisture introduced thereto and the rotational speed of the pelletizing drum utilized. With regard to the sizing of the finished pelletized composition my experimentation has shown that the best results are achieved when the drain cleaner composition pellets are in a range of particle sizes from about $\frac{1}{8}''$ to $1''$ diameter with optimum results when the pellets are in the size range of from about ⅛" to ½" diameter. It will be appreciated of course that the larger size pellets have a longer induction period before reaction when contacted with water and it has sometimes been found desirable to package the drain cleaner composition so as to have a range of pellet sizes, as long as there is substantially no tendency for the pellets to segregate, rather than all the pellets being of a single size. By sizing of the individual pellets as well as blending pellets of varying sizes it is possible to selectively control the induction period so as to provide a drain cleaner composition having the most desirable properties for the task at hand.

Certain portions of the equipment utilized in carrying forth the method of the present invention are preferably swept free of moisture laden air with air which has its moisture reduced by passing through an air conditioner to condense out most of the moisture, after which it is rewarmed to room temperature or above prior to being introduced into the equipment.

It will also be noted that the open faced auger must be constructed and operated in a manner which assures that the water sprayed in the auger to tackify the composition is distributed uniformly over the batch with particular attention to the proper volume of water-batch weight relationship.

With further regard to the equipment utilized, it has been found that the general configuration of the rotary pelletizing drum utilized should be such that the vanes situated on the interior surface of the drum should be designed so as to cause the product to roll rather than slide as the drum rotates yet not to cut the material or carry it to the top where it might fall thus disintegrating the pellets. Toward this end, and as shown in FIG. 2, it has been found that the rotary pelletizing drum is preferably provided with longitudinally extending vanes 11 such as fabricated from inverted angle iron wherein the outwardly projecting legs of the angle iron are rigidily secured to the interior surface of the drum so as to keep the composition being pelletized from sliding. Such vanes avoid breaking the particles as they agglomerate into pellets due to the fact that the vanes are generally incapable of carrying the partially pelletized material to the top of the drum from where it might fall and break up. In the practice of the invention it has been found that a rotary pelletizing drum having a diameter of approximately six feet provided with a plurality of equally spaced transverse angle iron vanes 11 having leg dimensions of approximately ½" to 3" is preferred. Further, it has been found that the drum should preferably be rotated at the rate of approximately 4 to 9 r.p.m., however, it will be appreciated that the optimum speed will vary somewhat with the diameter of the pelletizing drum and the desired size of the finished pellets.

The pellets being discharged from the rotary drum pass through a discharge hopper and into suitable sizing equipment where the spheres are graded by size. As indicated above the air in certain portions of the equipment is preferably dehumidified to prevent the absorption of excessive moisture by the spheres and also prevent agglomeration of the spheres. It has also been found to be desirable to reduce the temperature of the pellets discharging from the sizing equipment to prevent overreaction of the product to form a "soupy" unusable mass.

Toward this end the pellets discharging from the sizing equipment are passed through a screw conveyor heat exchanger 12 which is provided with a cooling jacket and is preferably also provided with a cooling tube through the center. It has been found that the pellets discharging from the heat exchanger should preferably be below approximately 110° F. in order to prevent the above-mentioned over-reaction.

A typical relationship between the pellet size of the drain cleaner composition produced in accordance with the method of the present invention and the time delay or induction period experienced in the maximum reaction of the pellets with water is set forth in the following table:

Pellet sizes: Induction period
Retained on a 2 mesh Tyler screen _____ 5
Retained on a 3 mesh Tyler screen _____ 3.5
Retained on a 4 mesh Tyler screen _____ 2.8
Retained on a 6 mesh Tyler screen _____ 2.2
Passing through a 6 Tyler mesh screen (fines) __ 0.8
Regular heterogeneous commercial drain cleaner composition _____ 0.4

The chemical composition of the homogeneous pellets comprising the improved drain cleaner composition produced in accordance with the method of the present invention is preferably as follows:

Caustic soda or caustic potash _____ About 45–65% by weight.
Particulate aluminum (needles and/or shot) __ About 4–10% by weight.
Sodium nitrate _____ About 20–40% by weight.
Sodium chloride, sodium carbonate or sodium silicate _____ About 5–20% by weight.
Wetting agent, oil, etc. ____ Trace amounts.
Water _____ About 5% by weight.

Copper sulphate may be added or omitted without appreciable difference. As indicated above a small amount of oil may be added to reduce hygroscopicity and a surfactant such as an alkyl aryl sulfonate may be added to improve the wetting-out action of the composition during utilization thereof. In addition, small quantities of talc or calcium stearate may be added to reduce the tendency of the pellets to cake subsequent to the pelletizing thereof.

The following examples are intended to more clearly illustrate my invention.

EXAMPLE I

A typical composition of an improved sewer or drain cleaner manufactured in the form of homogeneous generally spherical pellets having a pellet size of from approximately 2 to 6 mesh Tyler Standard prior to the addition of pelletizing water as set forth hereinafter would be:

Caustic soda _____ About 45–65% by weight.
Particulate aluminum (shot and/or needles) _____ About 4–10% by weight.
Crushed sodium nitrate ___ About 20–40% by weight.
Sodium chloride _____ About 20% by weight.

Referring now in more detail to the drawing, it will be understood that in carrying forth the several manipulative steps comprising the method of the present invention the pre-mix blender 1 is charged with approximately 1000 pounds of starting batch mix which is formulated proportionately on the basis of weight as set forth above which mixture is blended until intimately admixed. The presence of about 20% sodium chloride in the composition facilitates production of the spherical pellets under the conditions set forth hereinafter.

The intimately admixed batch is then conveyed by conveyor 2 or the like to batch holding hopper 3. A starting batch mix of about 1000 pounds requires a total amount of about 51 pounds of water or about 5.1%. A metering auger 4 feeds the intimately admixed batch through the open-face spray auger 5 where a portion, approximately 34 pounds of water at approximately 130° to 155° F., of the water required is sprayed onto the intimately admixed dry composition so as to "tackify" the particulate composition being certain that the amount of water sprayed on the composition as it is fed through the auger is uniformly distributed so as to substantially preclude any localized over-reaction of the composition which would of course tend to make portions of the composition "soupy." Once the entire batch has been discharged from the auger 5 into the interior of the rotary drum 7 it will normally be observed that a slight amount of agglomeration has taken place, however, it will also be noted that the composition has partially dried due to the heat of the partial reaction between the water and the caustic and caustic and aluminum. After a delay of about three minutes from the spraying of the composition in the auger additional water at about 130° to 155° F. is sprayed on the partially agglomerated composition within the rotary pelletizing drum 7 by means of a plurality of rotary spray nozzles 8, which in the case of a 1000 pound batch of starting mix is approximately an additional 17 pounds of water. The total amount of water required is thus approximately 5.1%. Rotation of the pelletizing drum is continued at about 7 r.p.m. until the mix has substantially dried from the heat of reaction of the components of the composition. It has been found that pelletization is best accomplished when the material in the rotary drum is at about 135° to 150° F. and preferably 140° to 145° F. as a consequence of the heat of reaction. The pelletized composition is then discharged from the rotary pelletizing drum 7 through the discharge hopper and is subsequently passed through sizing equipment 10 where the pellets are preferably graded out according to Tyler mesh standards preferably between a Tyler mesh of 2 and Tyler mesh of 6.

The sized pellets are then passed through a screw conveyor heat exchanger 12 provided with a cooling jacket and a centrally disposed tooling tube. The rate of flow of the pellets and the rate at which the cooling medium flows through the jacket of the heat exchanger 12 is adjusted so as to discharge the product at below approximately 110° F., alternatively, if the product is not cooled in this manner, it must be stored in small quantities, e.g., 25 to 50 pounds, until it cools. Larger improperly cooled quantities develop sufficient heat to over-react and become "soupy" and unusable.

EXAMPLE II

The method set forth in Example I was repeated with the exception that the weight of the intimately admixed starting batch was 2000 pounds. As indicated heretofore, the water required to properly pelletize a batch varies inversely with the batch size. Accordingly, this batch required the addition of approximately 90 pounds of water at a temperature of about 130° to 155° F., or approximately 4.5% of the weight of the starting batch. About two-thirds of the water required was added in the rotary spray auger with the remainder being added in the rotary drum. As with Example I the practice of the method of Example II resulted in the production of homogeneous generally spherical pellets suitable for use as a sewer or drain line cleaner.

EXAMPLE III

The method set forth in Example I was again repeated with the exception that the weight of the intimately admixed starting batch was 3000 pounds. This batch required the addition of approximately 130 pounds of water at a temperature of about 130° to 155° F., which water was approximately 4.3% of the weight of the starting batch. Approximately two-thirds of the water required was added in the rotary spray auger with the remainder being added in the rotary drum. The practice of the method of Example III resulted in the production of homogeneous spherical pellets.

As indicated heretofore the moisture laden air present in certain portions of the equipment, namely the rotary drum 7, discharge hopper 9, sizing equipment 10 and cooling auger 12, is constantly swept out by dehumidified air warmed to room temperature supplied from suitable air conditioning equipment indicated at 14. The treatment of the air within the equipment in this manner greatly increases the yield of acceptable pelletized product and insures efficient operation independent of external atmospheric humidity.

EXAMPLE IV

The first stage of the method in Example I was used and the water sprayed in the open face auger 5. This material was conveyed to a California Pelletizing Mill not shown from which pellets were extruded to cylinders approximately 3/16" in diameter and of approximately 1/4" to 1/2" in length. These were conveyed to the rotary drum 7 and rotated until the sharp edges were worn off. Small quantities of water were then sprayed to form generally rounded pellets by combination of wear and agglomeration. The pellets were then further processed as in Example I.

When one part of the pelletized drain cleaner compositions of Examples I–IV is placed in about three to four parts of water, the water-soluble components, namely the caustic etc. react with the aluminum, generating large quantities of heat and ammonia gas. As indicated previously the improved physical form of the drain cleaner composition produced in accordance with the method of the present invention permits a delay in the induction of the aforementioned reaction thereby permitting the pellets to pass downwardly within a sewer, drain or the like which is filled with water without substantially reacting with the water thus permitting the pellets to reach the general area of the impediment to be cleared from the drain line before any substantial reaction takes place.

Accordingly, it may be seen that the pelletized sewer or drain cleaner composition produced in accordance with the present invention is safer, easier, to handle, more economical and efficient in use than drain cleaner compositions made by methods known heretofore.

In summary, the advantages of the method of manufacturing the improved drain cleaner composition by the method of the present invention are such that homogeneous spherical pellets may be produced without necessitating the melting of the highly corrosive caustic. This of course leads to substantial economies of operation in preparing a drain cleaner composition which is substantially devoid of any tendency to segregate during the packaging, storage, shipment and utilization thereof thereby insuring more complete reaction and better heat generation than possible with drain cleaner compositions produced by methods known heretofore.

Inasmuch as the invention resides in the method of pelletizing the drain cleaner composition such other and further alterations and modifications of the proportions of the several components of the compositions are contemplated as would normally occur to those skilled in the art to which the invention relates.

What is claimed as new is as follows:

1. A method of producing a cleaning composition liberating heat when added to water characterized by being in the improved physical form of homogeneous pellets having representative proportions of each component comprising the composition which method comprises:
    (a) intimately admixing a composition comprising on the basis of weight 45–65% of an alkaline agent selected from the group consisting of sodium hydroxide and potassium hydroxide, 4–10% of a finely divided particulate aluminum, 20–40% of particulate sodium nitrate and about 5–20% of a pelletizing compound selected from the group consisting of sodium chloride, sodium carbonate and sodium silicate;
    (b) tackifying the intimately admixed composition by spraying a portion of a total amount of water of about 4.0%–5.1% of the weight of the intimately admixed composition, at about 130° to 155° F., onto the composition to effect partial agglomeration thereof;
    (c) introducing the partially agglomerated composition into a rotary drum pelletizing apparatus and spraying the partially agglomerated composition with additional water comprising the remainder of said 4.0% to 5.1% of water at about 130° to 155° F. sufficient to cause the mixture to form homogeneous pellets as the composition is acted upon by the rotary drum pelletizing apparatus;

(d) drying said homogenous pellets; and (e) passing the homogeneous pellets produced through a heat exchanger to reduce their temperature prior to packaging so as to preclude any significant reaction thereafter of the components and caking of the individual pellets.

2. The method of claim 1 wherein about two-thirds of the total amount of water required is added in step (b) and about one-third of the water is added in step (c).

3. The method of claim 1 wherein the temperature of the material in the rotary drum is approximately 135° to 150° and preferably 140° to 145° during the formation of the pellets.

4. The method of claim 1 wherein step (b) is carried forth by spraying the water onto the mixture as it is fed through an open-faced auger.

5. The method of claim 1, wherein the pelletizing compound is sodium chloride and comprises about 20% by weight of the composition.

6. A method of producing a cleaning composition that liberates heat when added to water characterized by being in the improved physical form of homogeneous pellets having representative proportions of each component comprising the composition, which method comprises:

(a) intimately admixing a composition comprising by weight about 45–65% of an alkaline agent selected from the group consisting of sodium hydroxide and potassium hydroxide, about 4–10% of finely divided particulate metallic components selected from the group consisting of aluminum and a mixture of aluminum and zinc, about 20–40% of a particulate water-soluble inorganic nitrate, and about 5–20% of a compound selected from the group consisting of sodium chloride, sodium carbonate and sodium silicate;

(b) tackifying the intimately admixed composition by spraying a portion of a total amount of water of about 4.0–5.1% of the weight of the intimately admixed composition, at about 100°–160° F., onto the composition to effect partial agglomeration thereof;

(c) agglomerating said partially agglomerated composition by spraying the composition with additional water comprising the remainder of the weight 4.0–5.1% water, at about 100°–160° F., sufficient to cause the mixture to form homogeneous pellets;

(d) drying said homogeneous pellets; and (e) reducing the temperature of the homogeneous pellets below about 110° F. prior to packaging.

7. The method of claim 6, wherein the spraying in step (c) follows the spraying in step (b) after a time which is sufficient to allow a partial drying of the partially agglomerated composition.

8. The method of claim 6, wherein the spraying in step (c) follows the spraying in step (b) after a delay of about three minutes.

9. The method of claim 6 wherein about two-thirds of the total amount of water required is added in step (b) and about one-third of the water is added in step (c).

10. The method of claim 6 wherein the temperature of the material in the rotary drum is approximately 135° to 150° and preferably 140° to 145° F. during the formation of the pellets.

11. The method of claim 6 wherein step (b) is carried forth by spraying the water onto the mixture as it is fed through an open-faced auger.

References Cited
UNITED STATES PATENTS

| | | | |
|---|---|---|---|
| 3,039,165 | 6/1962 | Old | 264—142 |
| 2,721,806 | 10/1955 | Oberg et al. | 263—32 |
| 2,999,293 | 9/1961 | Taff et al. | 264—117 |
| 3,471,407 | 10/1969 | Spring | 264—117 |

ROBERT F. WHITE, Primary Examiner

J. R. HALL, Assistant Examiner

U.S. Cl. X.R.

252—157, 192